(12) United States Patent
Sugimura et al.

(10) Patent No.: US 6,988,422 B2
(45) Date of Patent: Jan. 24, 2006

(54) MAGNETIC TORQUE SENSOR INCLUDING INTEGRAL SUB-UNITS

(75) Inventors: Kiyoshi Sugimura, Toyoake (JP); Naoki Nakane, Toyota (JP); Shigetoshi Fukaya, Toyota (JP); Kenji Takeda, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 66 days.

(21) Appl. No.: 11/043,074

(22) Filed: Jan. 27, 2005

(65) Prior Publication Data

US 2005/0126310 A1     Jun. 16, 2005

Related U.S. Application Data

(63) Continuation of application No. 10/374,104, filed on Feb. 27, 2003, now Pat. No. 6,868,744.

(30) Foreign Application Priority Data

Mar. 7, 2002   (JP) ............................... 2002-61260
Sep. 27, 2002  (JP) ............................... 2002-283425

(51) Int. Cl.
  *G01L 3/02*   (2006.01)
(52) U.S. Cl. ............................................. 73/862.334
(58) Field of Classification Search ........... 73/862.328, 73/862.329, 862.331, 862.332, 862.333, 73/862.334
See application file for complete search history.

(56) References Cited

U.S. PATENT DOCUMENTS

| | | | |
|---|---|---|---|
| 4,530,413 A | 7/1985 | Buike et al. | |
| 4,566,338 A | 1/1986 | Fleming et al. | |
| 4,724,710 A | 2/1988 | Murty | |
| 4,784,002 A | 11/1988 | Io et al. | |
| 4,984,474 A | 1/1991 | Matsushima et al. | |
| 6,341,426 B1 | 1/2002 | Okumura | |
| 6,868,744 B2 * | 3/2005 | Sugimura et al. | 73/862.333 |
| 2002/0189371 A1 | 12/2002 | Nakane et al. | |
| 2003/0167857 A1 * | 9/2003 | Sugimura et al. | 73/862.333 |
| 2004/0105602 A1 * | 6/2004 | Mizutani et al. | 384/448 |

FOREIGN PATENT DOCUMENTS

| | | |
|---|---|---|
| DE | 198 16 568 A1 | 11/1999 |
| JP | A-H11-304607 | 11/1999 |
| WO | WO 02/071019 A1 | 9/2002 |

* cited by examiner

*Primary Examiner*—Max Noori
(74) *Attorney, Agent, or Firm*—Posz Law Group, PLC

(57) ABSTRACT

A pair of magnetic flux collecting rings and a magnetic sensor are integrally covered by a molded resin to form a sub unit of a torque sensor. The pair of rings and sensors are integrated and are in contact with each other, i.e., the magnetic sensor is held in between respective magnetic flux collecting portions of the rings without any air gap formed therebetween. Magnetic flux collected by the rings can be detected by the magnetic sensor to a maximum degree, whereby the signal output of the magnetic sensor is enhanced and made stable.

14 Claims, 6 Drawing Sheets

MAGNETIC TORQUE SENSOR INCLUDING INTEGRAL SUB-UNITS

CROSS REFERENCE TO RELATED APPLICATION

This is a continuation of U.S. patent application Ser. No. 10/374,104, which was filed on Feb. 27, 2003 now U.S. Pat. No. 6,868,744. This application is based upon, claims the benefit of priority of, and incorporates by reference the contents of prior Japanese Patent Application No. 2002-61260 filed on Mar. 7, 2002, and No. 2002-283425 filed on Sep. 27, 2002.

BACKGROUND OF THE INVENTION

1. Field of the Invention

The present invention relates to a torque sensor for detecting torque applied to a rotating shaft based on measurement of changes in magnetic flux density or magnetic field intensity.

2. Description of the Related Art

The present inventors have filed a prior patent application relating to a torque sensor (Japanese Patent Application No. 2001-316788, U.S. Patent Application Publication No. 2002-189371). This torque sensor generally includes a torsion bar connecting an input shaft and an output shaft, a multi-pole magnet fixed to one end of this torsion bar, a pair of multi-pole yokes fixed to the other end of the torsion bar and disposed inside a magnetic field generated by the multi-pole magnet, a pair of magnetic flux collecting rings for introducing magnetic flux from the multi-pole yokes, and a magnetic sensor for detecting magnetic field intensity via the rings.

The pair of magnetic flux collecting rings are each provided with portions that have the function of collecting magnetic flux directed from the multi-pole yokes, and these portions are arranged opposite to each other. The magnetic sensor is interposed between these mutually opposing magnetic flux collecting portions of the rings. When the torsion bar is twisted, magnetic flux is generated between the pair of multi-pole yokes due to a change in the relative positional relationship between the multi-pole magnet and multi-pole yokes in the circumferential direction. The magnetic flux is collected by the pair of rings, and the magnetic sensor detects the density of the magnetic flux.

It is crucial, in this torque sensor, to utilize the magnetic flux collected by the rings as much as possible. However, because the magnetic sensor is interposed between the magnetic flux collecting portions of the rings, there exists a problem of magnetic flux leakage through the inevitable air gaps between the magnetic sensor and magnetic flux collecting portions. This leakage causes a decrease in signal output from the sensor.

Another problem is that, since the air gaps in each and every product cannot possibly be made constant because of slight variations resulting from assembling tolerances, the signal output from the sensors tends to be slightly different.

SUMMARY OF THE INVENTION

The present invention has been devised taking into consideration the above circumstances, its object being to provide a torque sensor capable of enhanced and stable signal output, which is achieved by minimizing magnetic flux leakage.

To achieve the above object, the present invention provides a torque sensor including a torsion bar coaxially connected at opposite ends to a first shaft and a second shaft for converting torque applied between both shafts into a torsional displacement. Also provided are: a multi-pole magnet fixed to the first shaft or one end of the torsion bar, a multi-pole yoke fixed to the second shaft or the other end of the torsion bar for forming a magnetic circuit within a magnetic field generated by the multi-pole magnet, a pair of magnetic flux collecting members for collecting magnetic flux from the multi-pole yoke, and a magnetic sensor for detecting magnetic field intensity via the pair of magnetic flux collecting members. The characteristic feature of this torque sensor is that the magnetic sensor and the pair of magnetic flux collecting members are assembled as one piece.

This construction enables the air gaps between the magnetic flux collecting members and magnetic sensor to be minimal, whereby the magnetic sensor can maximally detect collected magnetic flux.

In the above torque sensor, the magnetic sensor and the pair of magnetic flux collecting members may integrally be covered by a molded resin, and a signal cable from the magnetic sensor and a terminal connected to the signal cable may be embedded in the molded resin. This construction integrates the magnetic sensor, the pair of magnetic flux collecting members, and the terminal by the molded resin, thereby facilitating assembly of these components to a housing or the like. In the molded resin, a connector for holding the terminal may also be integrally provided, thereby facilitating assembly.

Alternatively, the torque sensor may have a lead wire for an external electrical connection of the terminal, one end of which lead wire is embedded in the molded resin and connected to the terminal inside the molded resin. A reduction in cost can be achieved by the omission of the connectors.

The pair of magnetic flux collecting members may be formed either in a ring shape or in a semicircular shape. Ring-shaped magnetic flux collecting members will prevent a displacement of their axial centers relative to the multi-pole yokes, and thus can reduce detecting errors of the magnetic sensor. The semicircular design will offer better and easier assembly, since it allows assembly along a radial direction.

The pair of magnetic flux collecting members and the magnetic sensor may separately be molded of resin and assembled as one piece. This construction will facilitate the positioning of the magnetic flux collecting members and magnetic sensors relative to each other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

Preferred embodiments of the present invention will be hereinafter described with reference to the accompanying drawings. The following description of the preferred embodiments is merely exemplary in nature and is in no way intended to limit the invention, its application, or uses.

First Embodiment

Figure 1A:
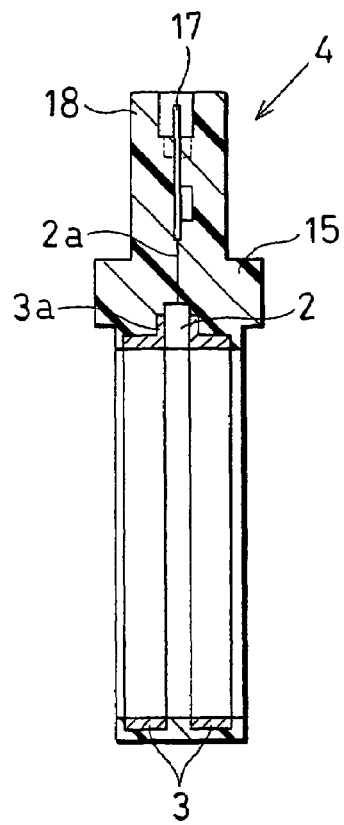
FIG. 1A is a cross-sectional view of a sub unit of a torque sensor according to a first embodiment of the present invention.
Figure 1B:
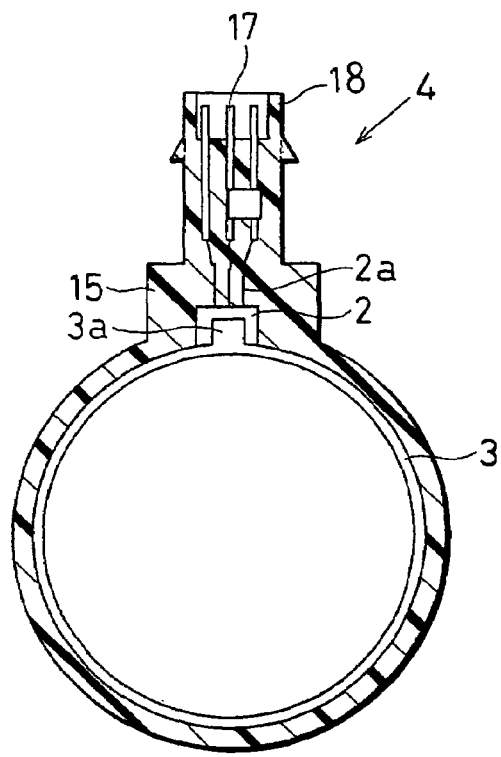
FIG. 1B is a cross-sectional view of a sub unit of a torque sensor according to a first embodiment of the present invention.

FIG. 1A and FIG. 1B are cross-sectional views of a sub unit 4 used in a torque sensor 1 including a magnetic sensor 2 and a pair of magnetic flux collecting rings 3 according to a first embodiment of the present invention.

Figure 4:
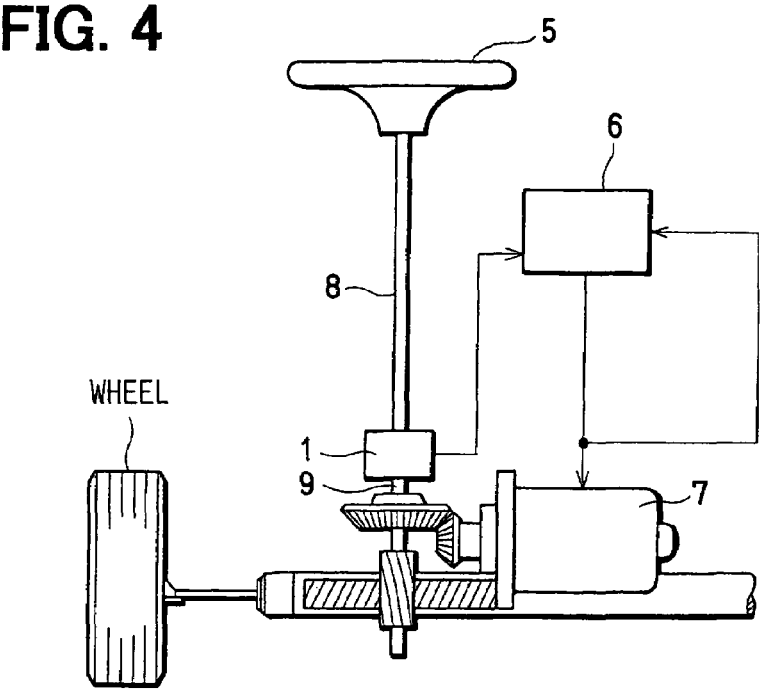
FIG. 4 is a schematic illustration of an electric power steering system.

The torque sensor 1 of this embodiment is employed, for example, in an electric power steering system for a vehicle shown in FIG. 4, for detecting steering power or torque applied to the shaft of the steering 5, and outputting the detected torque to an electric control unit (ECU) 6. The ECU 6 controls output of an electric motor 7 according to the steering power detected by the torque sensor 1.

Figure 3:
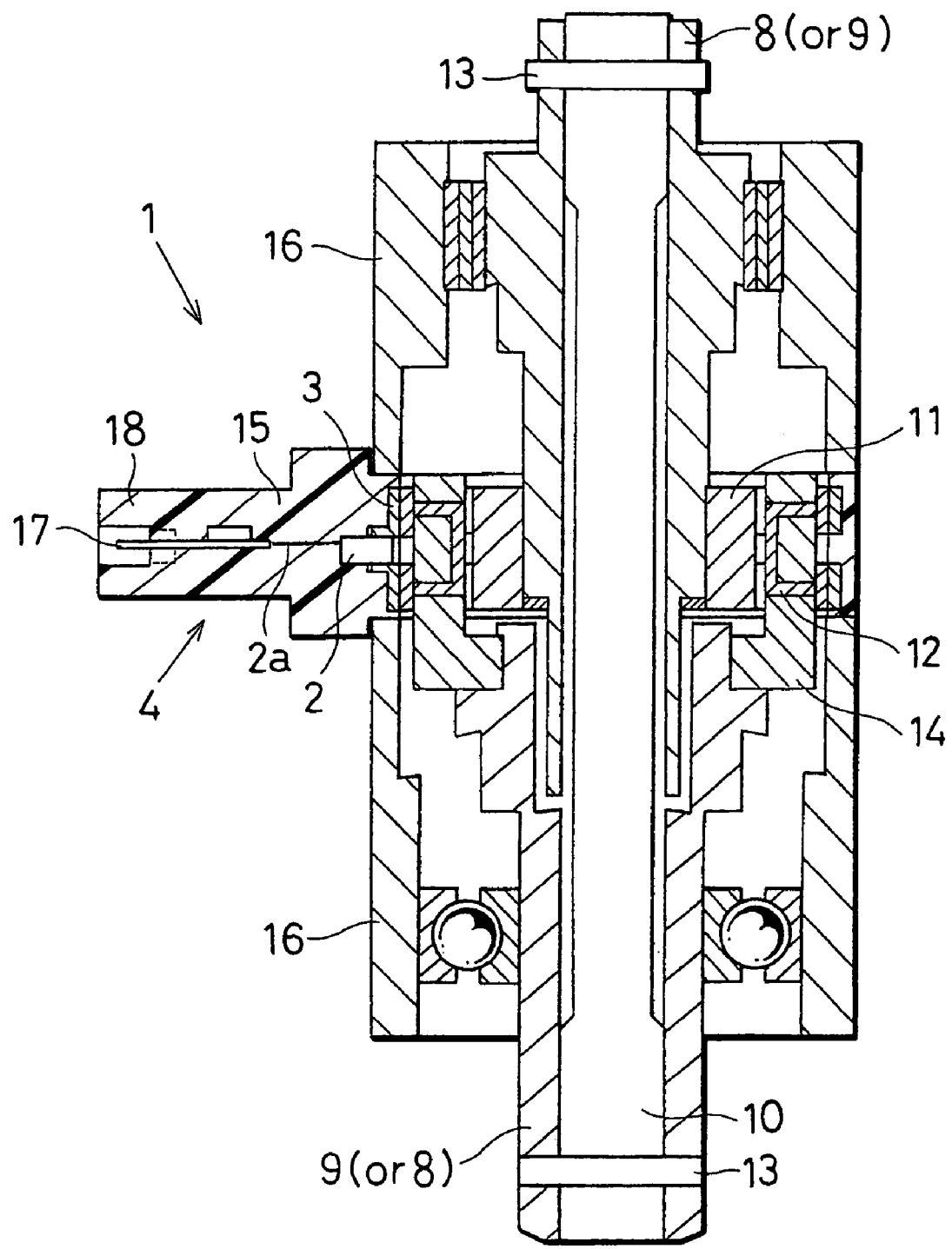
FIG. 3 is a cross-sectional view of the entire torque sensor.

As shown in FIG. 3, the torque sensor 1 is disposed between an input shaft 8 and an output shaft 9 that constitute the steering shaft. The torque sensor 1 is comprised of a torsion bar 10, a multi-pole magnet 11, a pair of multi-pole yokes 12, a pair of magnetic flux collecting rings 3, and a magnetic sensor 2.

The torsion bar 10 is a bar-like resilient member, and its opposite axial ends are fixed to the input shaft 8 and output shaft 9 by pins 13, respectively. Application of steering torque to the steering shaft produces a torsional displacement in the torsion bar 10 according to the torque. The multi-pole magnet 11 is formed in a ring shape and composed of North and South poles alternately arranged in a circumferential direction. The multi-pole magnet 11 is press-fitted and fixed to an outer circumference of either the input shaft 8 or the output shaft 9.

Figure 2A:
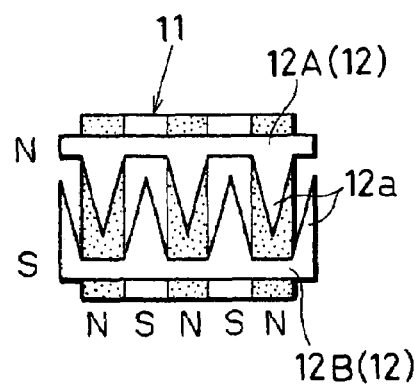
FIG. 2A is a diagram for explaining the operation of the torque sensor.
Figure 2B:
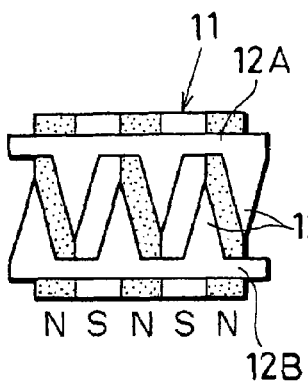
FIG. 2B is a diagram for explaining the operation of the torque sensor.
Figure 2C:
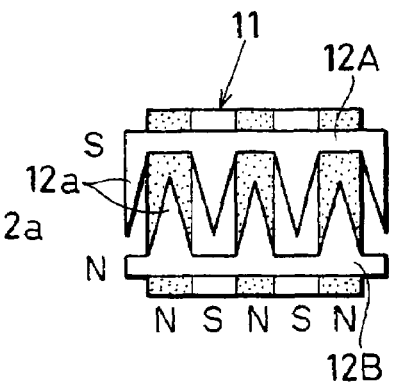
FIG. 2C is a diagram for explaining the operation of the torque sensor.

The pair of multi-pole yokes 12 are ring-shaped and made of a soft magnetic material. They each have a plurality of circumferentially, equally spaced claws 12a, and are arranged such that their respective claws 12a engage with each other with an air gap between them, as shown in FIG. 2B. The pair of multi-pole yokes 12 are disposed close to the outer circumference of the multi-pole magnet 11, and fixed to either of the input shaft 8 or the output shaft 9 by a holder 14.

The multi-pole yokes 12 (12A, 12B) are positioned relative to the multi-pole magnet 11 such that, when the torsion bar 10 is not twisted, each axial center of the claws 12a of the multi-pole yokes 12 (12A, 12B) coincides with a boundary between immediately adjacent North and South poles of the multi-pole magnet 11 as shown in FIG. 2B. Thus, the output voltage of the magnetic sensor 2 is zero when no steering power is applied between the input shaft 8 and output shaft 9.

The pair of magnetic flux collecting rings 3 are made of the same soft magnetic material as the multi-pole yokes 12 and are disposed close to the outer circumference of the multi-pole yokes 12. The rings 3 have the function of collecting magnetic flux from the multi-pole yokes 12. They are provided with respective plate-like magnetic flux collecting portions 3a at one location in the circumferential direction, which are arranged opposite to each other. The magnetic sensor 2 is interposed between these magnetic flux collecting portions 3a of the pair of rings 3 for detecting the density of magnetic flux generated therebetween.

The magnetic flux collecting rings 3 and magnetic sensor 2 are integrally covered by a molded resin 15 to form the sub unit 4 as shown in FIG. 1A and FIG. 1B, which is assembled to a column housing 16 that supports the steering shaft from an axial direction (see FIG. 3). The rings 3 and sensor 2 are integrated such that the magnetic sensor 2 is interposed between the magnetic flux collecting portions 3a of the rings 3 without any gap therebetween, i.e., they are in close contact with each other.

The sub unit 4 includes a terminal 17 that is connected to a signal cable 2a of the magnetic sensor 2 and embedded in the molded resin 15. A connector 18 for holding the terminal 17 is also provided integrally in the molded resin 15.

The torque sensor of this embodiment operates as follows:

When no steering torque is applied to the torsion bar 10, there is no torsional displacement in the torsion bar 10. In this state, each axial center of the claws 12a of the multi-pole yokes 12 coincides with each boundary between immediately adjacent North and South poles of the multi-pole magnet 11, as shown in FIG. 2B. The number of magnetic force lines extending from each of the North poles of the multi-pole magnet 11 to each of the claws 12a of the multi-pole yokes 12 is equal to that of the magnetic force lines extending from each of the South poles to each of the claws 12a. These magnetic force lines form closed loops, respectively, inside each of the pair of multi-pole yokes 12A, 12B, and do not leak into the air gap between both yokes. Thus the output of the magnetic sensor 2 is zero at this time.

When steering torque is input to the steering shaft, causing a torsional displacement in the torsion bar 10, the relative positions of the multi-pole magnet 11 and the pair of multi-pole yokes 12 are changed in a circumferential direction. The circumferential displacement between each of the axial centers of claws 12a and the boundary between adjacent North and South poles of the multi-pole magnet 11 causes an increase in the number of magnetic force lines of opposite polarity in each of the multi-pole yokes 12A, 12B. Magnetic fluxes of opposite polarity are thus generated between both yokes, which are directed by the rings 3 into their magnetic flux collecting portions 3a, and the sensor 2 detects the density of magnetic flux between the magnetic flux collecting portions 3a.

As described above, the torque sensor 1 of this embodiment has a sub unit 4 made up of a magnetic sensor 2 and a pair of magnetic flux collecting rings 3 integrated therewith. Since the sensor 2 is interposed between the magnetic flux collecting portions 3a of the rings 3 in contact therewith, there is no air gap formed between the sensor 2 and magnetic flux collecting portions 3a. Therefore, the collected magnetic flux can maximally be detected by the magnetic sensor 2. The sub unit 4 thus contributes to more stable and enhanced signal output of the magnetic sensor 2.

The sub unit 4 also provides a design for ease of assembly to the column housing 16 or the like as compared to a conventional torque sensor, because it enables the pair of magnetic flux collecting rings 3 and magnetic sensor 2 to be readily assembled to the column housing 16 from an axial direction as shown in FIG. 3.

Another advantage of the sub unit 4 is that, since it includes the terminal 17 and the connector 18 for retaining the terminal 17 that are both embedded in the molded resin 15, it enables several relevant components such as rings 3, sensor 2, terminals 17, and connectors 18 to be handled as one component, thus facilitating management of components.

Second Embodiment

Figure 5A:
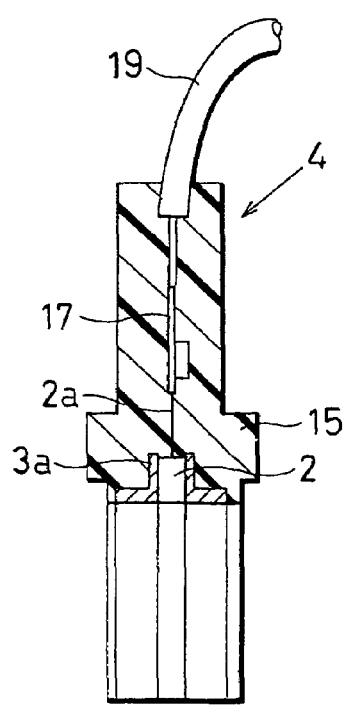
FIG. 5A is a cross-sectional view of a sub unit of a torque sensor according to a second embodiment of the present invention.
Figure 5B:
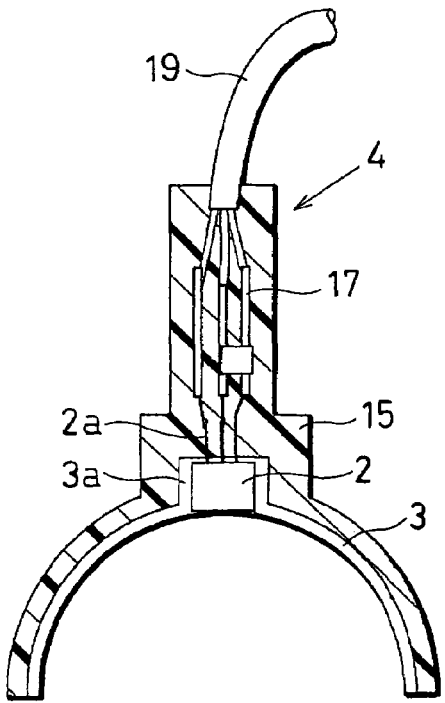
FIG. 5B is a cross-sectional view of a sub unit of a torque sensor according to a second embodiment of the present invention.

FIG. 5A and FIG. 5B are cross-sectional views of a sub unit 4 of a torque sensor according to a second embodiment of the present invention. The magnetic flux collecting rings 3 in this sub unit 4 are formed in a semicircular shape as can be seen from the drawings. This configuration enables the sub unit 4 to be assembled to the column housing 16 not only from an axial direction but also from a radial direction. It offers even better assembly of the sub unit 4 and allows more freedom of design for the column housing 16 and surrounding components.

The rings 3, even in their semicircular form, can exhibit equal magnetic flux collecting properties for directing magnetic flux from the multi-pole yokes 12. The sub unit 4 of this embodiment employs a lead wire 19 instead of the connector 18 in the previous embodiment. One end of the lead wire 19 is embedded in the molded resin 15 and is connected to the terminal 17 inside the molded resin 15. This results in a cost reduction because the connectors 18 are omitted.

Third Embodiment

Figure 6A:
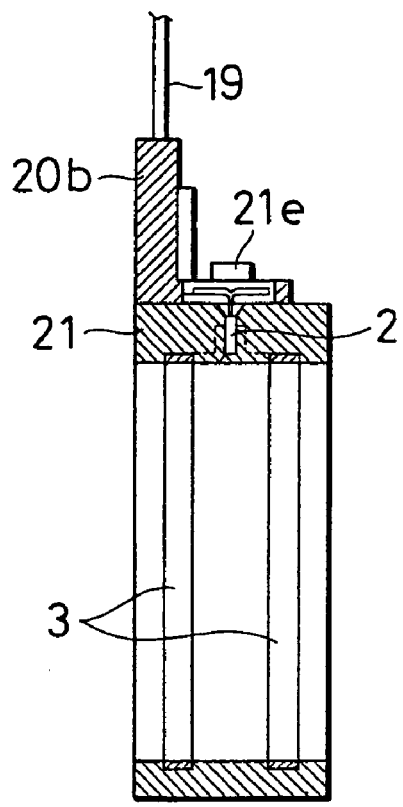
FIG. 6A is a cross-sectional view of an assembly of a magnetic sensor and a pair of magnetic flux collecting rings integrated with each other according to a third embodiment of the present invention.
Figure 6B:
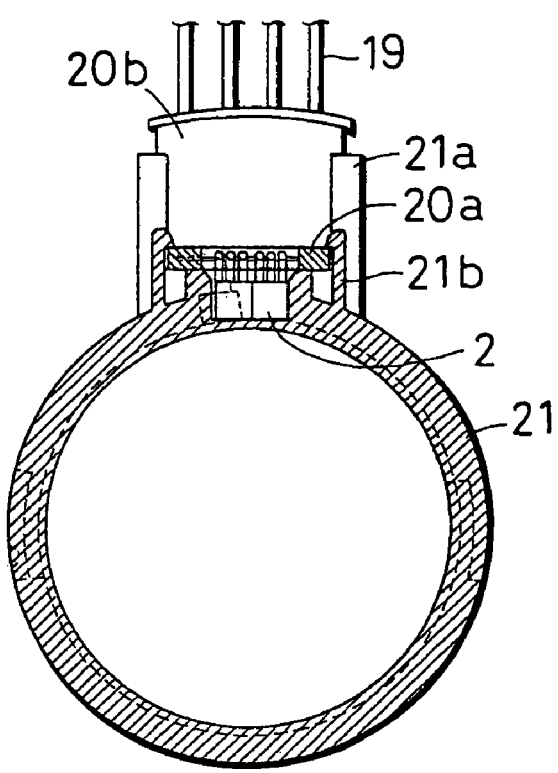
FIG. 6B is a cross-sectional view of an assembly of a magnetic sensor and a pair of magnetic flux collecting rings integrated with each other according to a third embodiment of the present invention.
Figure 6C:
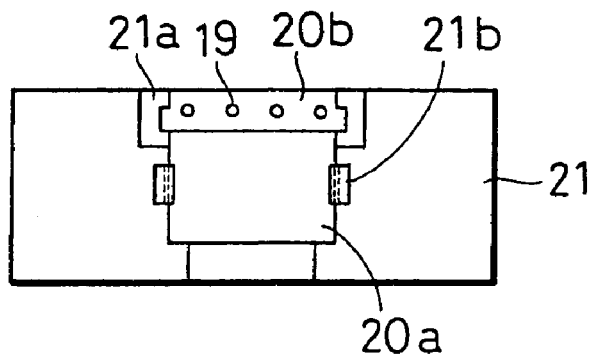
FIG. 6C is a plan view of the assembly as viewed from the side of the magnetic sensor.

FIG. 6A and FIG. 6B are cross-sectional views of an assembly of a magnetic sensor 2 and a pair of magnetic flux collecting rings 3 integrated therewith according to a third embodiment of the present invention. FIG. 6C is a top, plan view of the assembly viewed from the side of the magnetic sensor 2.

Figure 7A:
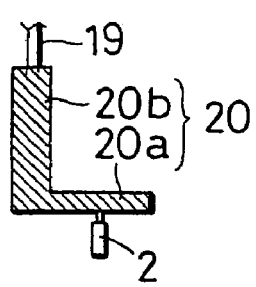
FIG. 7A is a cross-sectional view of a resin molded magnetic sensor.
Figure 7B:
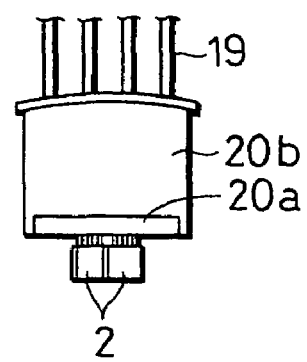
FIG. 7B is a front view of a resin molded magnetic sensor.

In this embodiment, the magnetic sensor 2 and the pair of magnetic flux collecting rings 3 are each resin molded before being assembled into one piece. Two sensors 2 are arranged side by side and the portions connected to their respective lead wires 19 are resin molded as shown in FIG. 7B. The sensor mold 20, which is the resin molded portion of the sensors, is formed in an L-shape in cross section and has a seat portion 20a and a back portion 20b as shown in FIG. 7A. The two magnetic sensors 2 project from a bottom face of the seat portion 20a, and the ends of the lead wires 19 extend from a top end face of the back portion 20b.

Figure 7C:
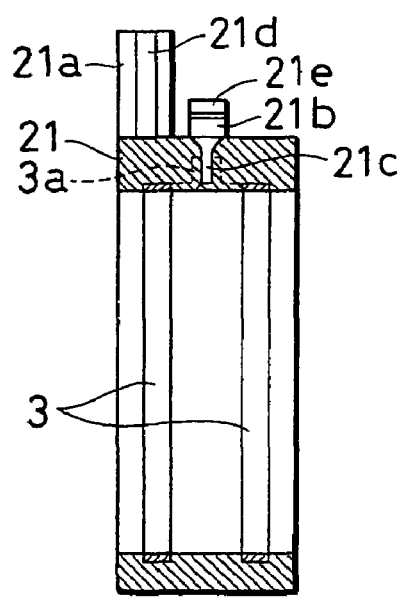
FIG. 7C is a cross-sectional view of resin molded magnetic flux collecting rings according to the third embodiment.

The pair of rings 3 are arranged such that their magnetic flux collecting portions 3a face each other as shown in FIG. 7C, and the outer circumferential sides of the rings are resin molded. The mold 21 covers only the outer side and their inner circumferential side is exposed. The mold 21 includes a holder portion 21a and a snap fit portion 21b for holding the sensor mold 20 and a hole 21c for accommodating the magnetic sensors 2.

The holder portion 21a consists of a pair of extended bars spaced apart a certain distance on an outer circumference of the mold 21. In an inner face of the mutually facing bars of the holder portion 21a are formed guide grooves 21d for guiding the back portion 20b of the sensor mold 20.

Figure 7D:
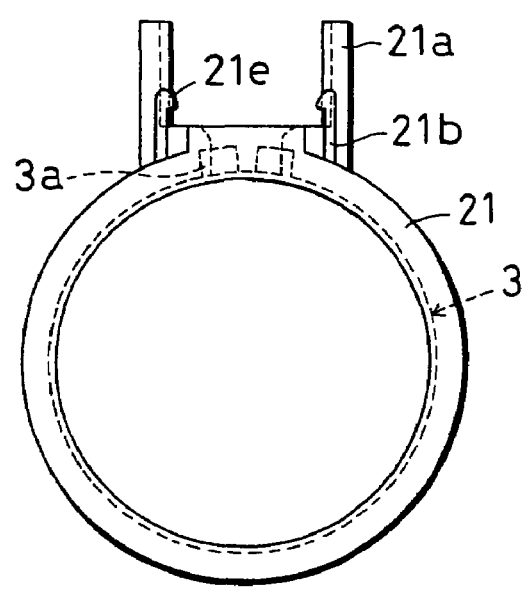
FIG. 7D is a front view of resin molded magnetic flux collecting rings according to the third embodiment.

The snap fit portion 21b also consists of a pair of bars similarly to the holder portion 21a, that protrude on an outer circumference of the mold 21. They are given a certain resiliency, and provided with hooks 21e as shown in FIG. 7D at their distal ends, for engaging with the seat portion 20a of the sensor mold 20 when the ring component is assembled to the sensor component.

The hole 21c communicates to a space between the mutually facing magnetic flux collecting portions 3a of the pair of rings 3, as shown in FIG. 7C. The distance between the mutually facing magnetic flux collecting portions 3a is designed such as to give a certain clearance between these portions and the magnetic sensors 2.

Figure 8:
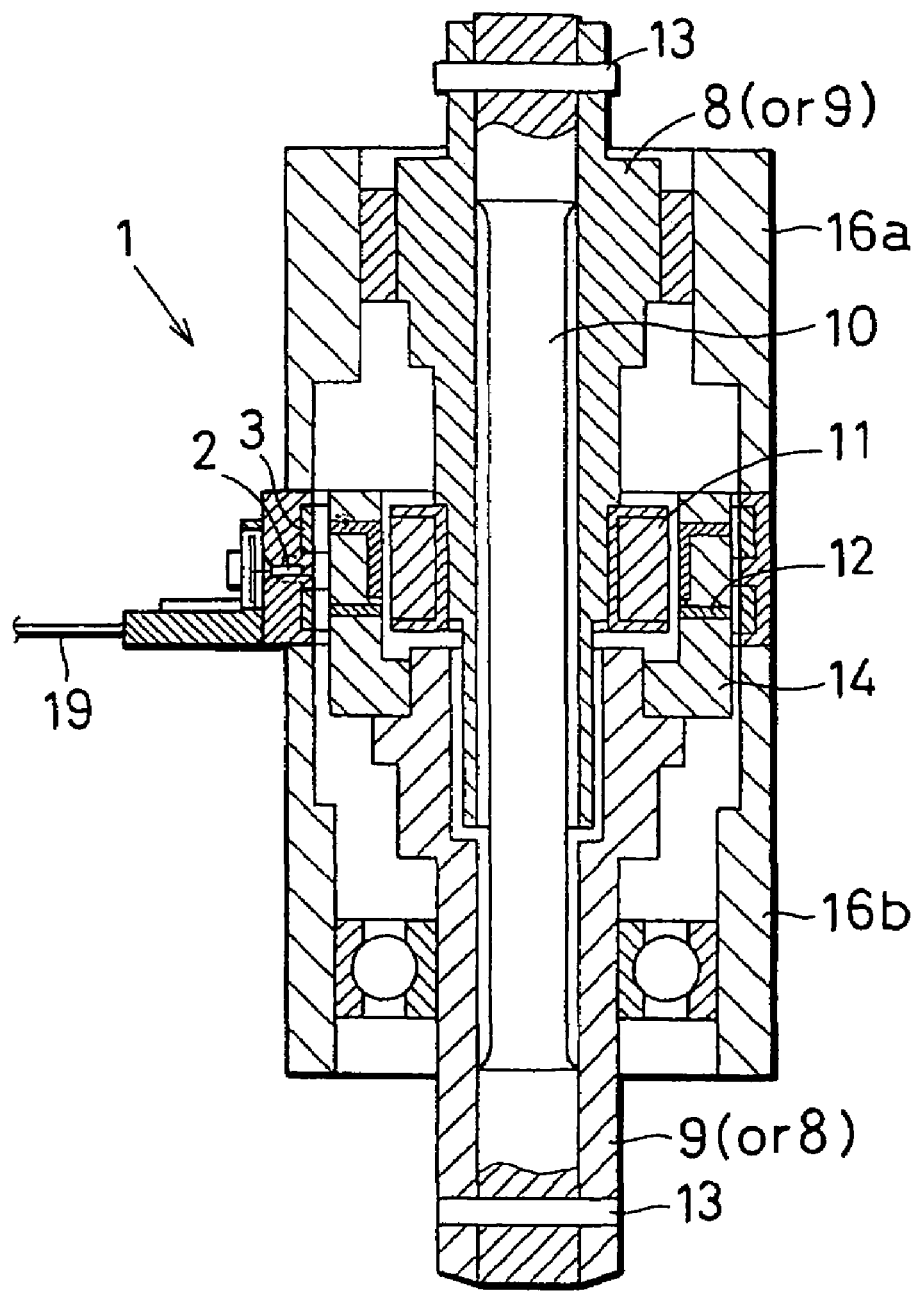
FIG. 8 is a cross-sectional view of the entire torque sensor according to the third embodiment.

When the ring component and sensor component are assembled into one piece, the magnetic sensors 2 are accommodated in the space between the opposing magnetic flux collecting portions 3a of the pair of rings 3, with the back portion 20b of the sensor mold 20 held by the holder portion 21a and the seat portion 20a of the sensor mold 20 retained by the snap fit portion 21b, as shown in FIG. 6B and FIG. 6C. This assembly, made up of the integrated rings 3 and sensors 2, is inserted and tightly held, as shown in FIG. 8, between a column housing 16a supporting the input shaft 8 and another column housing 16b supporting the output shaft 9.

According to the construction of this embodiment, since the pair of rings 3 and magnetic sensors 2 are integrated into a one-piece assembly, they can readily be positioned relative to each other. That is, the magnetic sensors 2 can be arranged at a predetermined location in the space between the two mutually facing magnetic flux collecting portions 3a of the rings 3 simply by inserting them into the hole 21c formed in the mold 21 covering the rings 3.

Similar to the first embodiment, there is practically no air gap formed between the magnetic sensors 2 and the magnetic flux collecting portions 3a of the rings 3. Therefore, the collected magnetic flux can be detected by the magnetic sensors 2 to a maximum degree.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque sensor comprising:
   a torsion bar having a first end connected to a first shaft and a second end connected to a second shaft for converting a torque applied between the first shaft and second shafts into a torsional displacement;
   a multi-pole magnet fixed to one of the first and second shafts and the first end of the torsion bar;
   a multi-pole yoke fixed to one of the first and second shafts and the second end of the torsion bar for forming a magnetic circuit within a magnetic field generated by the multi-pole magnet;
   a pair of magnetic flux collecting members for collecting a magnetic flux from the multi-pole yoke;
   a magnetic sensor in magnetic communication with said pair of magnetic flux collecting members for detecting an intensity of the magnetic field generated by the multi-pole magnet;
   a first molded part formed to integrally include at least a portion of the magnetic sensor; and
   a second molded part formed to integrally include at least a portion of the pair of magnetic flux collecting members and including a holder portion holding the first molded part.

2. The torque sensor according to claim 1, wherein the holder portion of the second molded part includes a guide groove receiving at least a portion of the first molded part.

3. The torque sensor according to claim 1, wherein the second molded part further includes a snap fit portion securely retaining the first molded part within the holder portion of the second molded part.

4. The torque sensor according to claim 1, wherein the first molded part includes a back portion supporting a lead wire for connecting the magnetic sensor to an electric control unit and engaging the holder portion of the second molded part.

5. The torque sensor according to claim 4, wherein the first molded part further includes a seat portion supporting the magnetic sensor in a hole of the second molded part.

6. The torque sensor according to claim 1, wherein the magnetic sensor includes two magnetic sensors located side by side.

7. The torque sensor according to claim 1, wherein the pair of magnetic flux collecting members are formed in one of a ring shape and a semi-circular shape.

8. A torque sensor comprising:
   a torsion bar having a first end connected to a first shaft and a second end connected to a second shaft for converting a torque applied between the first shaft and second shafts into a torsional displacement;
   a multi-pole magnet fixed to one of the first and second shafts and the first end of the torsion bar;
   a multi-pole yoke fixed to one of the first and second shafts and the second end of the torsion bar for forming a magnetic circuit within a magnetic field generated by the multi-pole magnet;
   a first resin-molded part that includes a pair of magnetic flux collecting members for collecting a magnetic flux from the multi-pole yoke;
   a second resin-molded part that includes:
      a magnetic sensor in magnetic communication with said pair of magnetic flux collecting members for detecting an intensity of the magnetic field generated by the multi-pole magnet;
      a holder portion that holds the first molded part in engagement with the second molded part.

9. The torque sensor according to claim 8, wherein the holder portion includes a guide groove that receives a mating portion of the first molded part.

10. The torque sensor according to claim 8, wherein the second molded part further includes a snap fit portion that securely retains the first molded part within the holder portion of the second molded part.

11. The torque sensor according to claim 8, wherein the first molded part includes a back portion that supports a lead wire for connecting the magnetic sensor to an electric control unit and that engages the holder portion of the second molded part.

12. The torque sensor according to claim 11, wherein the first molded part further includes a seat portion that supports the magnetic sensor in a hole of the second molded part.

13. The torque sensor according to claim 8, wherein the magnetic sensor includes two magnetic sensors located side by side.

14. The torque sensor according to claim 8, wherein the pair of magnetic flux collecting members are formed in one of a ring shape and a semi-circular shape.

* * * * *